United States Patent
Henderson et al.

(10) Patent No.: US 9,593,262 B2
(45) Date of Patent: Mar. 14, 2017

(54) SHRINK FILMS AND RELATED COMBINATIONS AND METHODS

(71) Applicant: Avery Dennison Corporation, Pasadena, CA (US)

(72) Inventors: Kevin O. Henderson, Willoughby Hills, OH (US); Hoang T. Pham, Painesville, OH (US)

(73) Assignee: Avery Dennison Corporation, Glendale, CA (US)

( * ) Notice: Subject to any disclaimer, the term of this patent is extended or adjusted under 35 U.S.C. 154(b) by 575 days.

(21) Appl. No.: 13/956,960

(22) Filed: Aug. 1, 2013

(65) Prior Publication Data
US 2014/0053509 A1    Feb. 27, 2014

Related U.S. Application Data

(60) Provisional application No. 61/678,319, filed on Aug. 1, 2012, provisional application No. 61/701,743, filed on Sep. 17, 2012.

(51) Int. Cl.
*B32B 3/02* (2006.01)
*C09J 7/02* (2006.01)
(Continued)

(52) U.S. Cl.
CPC ............... *C09J 7/0232* (2013.01); *B32B 1/02* (2013.01); *B32B 1/08* (2013.01); *B32B 7/06* (2013.01);
(Continued)

(58) Field of Classification Search
CPC ............. C09J 7/0239; Y10T 428/1476; Y10T 428/1352; Y10T 428/24802;
(Continued)

(56) References Cited

U.S. PATENT DOCUMENTS

| 3,671,236 A | 6/1972 | van Beusekom |
| 4,386,183 A | 5/1983 | Wempe |

(Continued)

FOREIGN PATENT DOCUMENTS

| DE | 3244120 | 5/1984 |
| EP | 0610008 | 8/1994 |

(Continued)

OTHER PUBLICATIONS

International Search Report and Written Opinion issued in corresponding IA No. PCT/US2013/053238 issued Feb. 3, 2014.

(Continued)

*Primary Examiner* — Elizabeth Mulvaney
(74) *Attorney, Agent, or Firm* — Avery Dennison Corporation

(57) ABSTRACT

The present subject matter provides a shrink film free of silicon-containing material, fluorine-containing material, and solvent-formed seams. The shrink film utilizes a water soluble layer covering an adhesive layer. The water soluble layer is in dry form and non-tacky, allowing processing of the shrink film subsequent to adhesive application to the shrink film. When the water soluble layer is dissolved, the adhesive layer is exposed and is capable of forming a permanent bond. The adhesive can be used to form a seam in the film and/or can be used to form a bond between the film and a substrate. The water soluble layer facilitates removal of an optional release liner from the adhesive. A substrate with the shrink film attached thereto and a related method of attaching a heat shrinkable film to a substrate are also disclosed.

10 Claims, 4 Drawing Sheets

(51) Int. Cl.
B32B 7/12 (2006.01)
B32B 27/30 (2006.01)
B32B 27/32 (2006.01)
G09F 3/10 (2006.01)
B32B 1/08 (2006.01)
B32B 27/06 (2006.01)
B65B 11/06 (2006.01)
B65D 75/00 (2006.01)
G09F 3/04 (2006.01)
B32B 1/02 (2006.01)
B32B 38/10 (2006.01)
B32B 7/06 (2006.01)
B32B 27/08 (2006.01)
B32B 27/36 (2006.01)
B32B 37/12 (2006.01)
B32B 37/26 (2006.01)

(52) U.S. Cl.
CPC ............... *B32B 7/12* (2013.01); *B32B 27/06* (2013.01); *B32B 27/08* (2013.01); *B32B 27/306* (2013.01); *B32B 27/32* (2013.01); *B32B 27/36* (2013.01); *B32B 38/10* (2013.01); *B65B 11/06* (2013.01); *B65D 75/002* (2013.01); *C09J 7/02* (2013.01); *G09F 3/04* (2013.01); *G09F 3/10* (2013.01); B32B 2037/1276 (2013.01); B32B 2037/268 (2013.01); B32B 2255/10 (2013.01); B32B 2255/26 (2013.01); B32B 2307/702 (2013.01); B32B 2307/736 (2013.01); B32B 2307/748 (2013.01); B32B 2439/00 (2013.01); B32B 2439/60 (2013.01); B32B 2439/70 (2013.01); C09J 2201/606 (2013.01); C09J 2203/334 (2013.01); Y10T 156/10 (2015.01); Y10T 428/1328 (2015.01); Y10T 428/1352 (2015.01); Y10T 428/1452 (2015.01); Y10T 428/24777 (2015.01); Y10T 428/24802 (2015.01); Y10T 428/2848 (2015.01); Y10T 428/31797 (2015.04); Y10T 428/31895 (2015.04); Y10T 428/31938 (2015.04)

(58) Field of Classification Search
CPC ... Y10T 248/31797; B32B 1/02; B32B 27/32; B32B 27/36; B32B 27/306; B32B 2307/31; B32B 2307/726; B32B 2307/748; B32B 38/0036; B32B 2439/00
See application file for complete search history.

(56) References Cited

U.S. PATENT DOCUMENTS

| | | | |
|---|---|---|---|
| 4,398,985 | A | 8/1983 | Eagon |
| 4,440,830 | A | 4/1984 | Wempe |
| 6,740,379 | B1 | 5/2004 | Congard et al. |
| 7,019,054 | B2 | 3/2006 | Dixit et al. |
| 7,828,923 | B2 | 11/2010 | Patel et al. |
| 2007/0275201 | A1 | 11/2007 | Okawa |
| 2008/0095960 | A1 | 4/2008 | Schell et al. |
| 2009/0038736 | A1* | 2/2009 | Lorence ................ B32B 27/32 156/86 |
| 2012/0034449 | A1 | 2/2012 | Imamura et al. |
| 2012/0059092 | A1 | 3/2012 | Lux et al. |
| 2012/0061014 | A1* | 3/2012 | Patel ..................... B31D 1/027 156/192 |

FOREIGN PATENT DOCUMENTS

| | | |
|---|---|---|
| EP | 0816069 | 1/1998 |
| GB | 1047460 | 11/1966 |
| JP | 9031424 | 2/1997 |
| JP | 9111206 | 4/1997 |
| JP | 2002-264264 | 9/2002 |
| WO | 03/016397 | 2/2003 |
| WO | 2007/015264 | 2/2007 |
| WO | 2007/079100 | 7/2007 |
| WO | 2011/139455 | 11/2011 |
| WO | 2013/032932 | 3/2013 |

OTHER PUBLICATIONS

International Preliminary Report on Patentability issued in corresponding IA No. PCT/US2013/053238 issued Feb. 12, 2015.
International Search Report and Written Opinion issued in corresponding IA No. PCT/US2013/053241 issued Oct. 2, 2013.
International Preliminary Report on Patentability issued in corresponding IA No. PCT/US2013/053241 issued Feb. 12, 2015.

* cited by examiner

SHRINK FILMS AND RELATED COMBINATIONS AND METHODS

CROSS-REFERENCE TO RELATED APPLICATIONS

The present application claims priority to U.S. Provisional Application Nos. 61/678,319 filed Aug. 1, 2012 and 61/701,743 filed Sep. 17, 2012, both of which are incorporated herein by reference in their entireties.

FIELD

The present subject matter relates to shrink wrap films and related methods that do not incorporate the use of a solvent material to form a sealed seam. The shrink films and related methods of the present subject matter use a water soluble layer covering an adhesive. Upon dissolution of the water soluble layer, the underlying adhesive is exposed and the adhesive is able to form the seal. The seal secures the film to itself during heating and shrinking of the film.

BACKGROUND

Shrink films are typically polymeric films that are applied over or around a substrate. Two portions of the film are bonded together to form a seal or seam that results in a sleeve, envelope, or tube configuration. When heated, the shrink wrap film contracts or shrinks by about 20% to about 70%, and more. The film shrinks to conform to the contours of the underlying substrate. Shrink films typically comprise polyvinyl chloride ("PVC"), glycol modified polyethylene terephthalate ("PETG"), or oriented polystyrene ("OPS").

The integrity of the shrink film seam needs to be maintained during the shrinking of the film around the container. If not maintained, the seam can partially or totally fail, causing unsightly seams or even seam failure.

There are several different strategies in forming the seam in shrink wrap films, all of which suffer from various drawbacks. The most common seam forming method utilizes a solvent to form the seam in the polymeric film. The solvent is normally applied to the polymeric shrink film immediately prior to forming the seam. The solvent rapidly dissolves the polymeric film and the film welds to itself when peripheral portions of the film are pressed together. Although solvent formed seams provide relatively good tack between peripheral film portions to maintain the seam during shrinking of the film, there are a number of drawbacks. Typical solvents are volatile organic compounds ("VOC" or "VOCs") that pose potential health and environmental concerns and are subject to environmental regulations. A typical solvent used in this sealing method is tetrahydrofuran ("THF"). THF is used to dissolve PVC films. THF is a VOC, and thus its use has potential disadvantages as mentioned. Other common solvents used in this method have similar difficulties.

Another problem with solvent seaming is that the amount of solvent applied to a seam must be closely regulated. Excess solvent can migrate away from the seam site into other locations on the film. This can cause the film to stick together outside the desired seam site. Additionally, the solvent can potentially diffuse through the film and come into contact with the substrate. Often, shrink wrap films are applied to polyethylene terephthalate ("PET") containers. THF is reactive with PET containers and tends to degrade such containers. Conversely, a deficient amount of solvent will form an inadequate seal, causing the seam to separate during film shrinking. Application of solvent to the seam site therefore has to be precisely controlled and monitored, and the seals need to be tested; all adding to production costs.

A further drawback of solvent seaming is that solvents are often specific to certain polymers used in the construction of the films. As film construction and film composition change with technology advancements, solvents must be continually tailored to dissolve those films. This causes added cost in research and development; making solvent systems less profitable.

Container recycling efforts are also stymied by solvent seaming methods. Traditional recycling methods often utilize a continuous water flotation process as a means to separate different types of plastic. When PVC shrink labels are applied to PET containers, the flotation separation process can not be used. This is because PVC films and PET containers have densities greater than water, causing both labels and containers to sink during the continuous water flotation process. Because of their high densities, PVC labels will sink with, rather than separate from, PET containers. Floating is thus not a viable means to separate PVC labels from PET bottles. Other, more expensive means must be used to separate the high density labels from the containers.

Another difficulty in solvent seaming is the mechanism used to make the seal, i.e. the dissolving of the polymeric film. Two issues, in particular, arise from the polymeric film being dissolved. One is that the solvent must be applied immediately prior to the seam being formed. The dissolved polymeric film is only capable of bonding to itself for a short time, i.e. a few seconds. If the film is left unsealed, the solvent will quickly evaporate away from the seam site, thus preventing a seam from being formed. The second issue is that no handling or processing can take place between the solvent application and seam formation. The seam must be formed directly after the solvent is applied. If not immediately sealed, the dissolved portion of the film could interfere with converting equipment by sticking, coating, or otherwise leaving a residue on the equipment.

Another seam forming method involves the use of heat-activated or ultraviolet light-activated ("UV") adhesives. Unlike solvent seaming, these adhesives can be used with low density polyolefin shrink films; thus allowing water separation from dense substrates for recycling efforts. These activatable adhesives are also not initially tacky when deposited on a shrink film; thus allowing further production processes between adhesive application and seam formation. Activatable adhesives require an external initiator to trigger their bonding capabilities. A major difficulty with activatable adhesives is that they typically do not provide a strong bond at the seam. To avoid seam failure, only shrink films with small shrink percentages can be used with activatable adhesives. Thus, in this type of application, only films with shrink percentages of less than 30% are typically used. Limiting films to less than 30% shrinkage limits the possible shape and contour variations for a substrate. With the container industry heading toward the use of highly-contoured, less conventionally-shaped containers, the bond strength provided by activatable adhesives typically does not allow sufficient shrinkage of the films. Additionally, activatable adhesives are slow to activate to a tacky state. This undesirably causes a time-lag in the labeling process and adds to production costs.

Another seam forming method is heat welding. This method uses a heat source (laser, hot bar, etc.) to melt a portion of the polymeric film, and weld the film to itself when the melted portion resolidifies. As with solvent seam forming methods, heat welding suffers from the difficulty that the heat must be applied to the film contemporaneous to the seam being formed. Another disadvantage of heat welding is the energy requirement to bring the polymeric shrink film up to a melting temperature; adding to production costs. The temperature variations of the heat welding apparatus and the amount of time the heat source is in communication with the film must also be closely regulated. Burn-through in the film is a common problem associated with heat welding methods. Abnormalities in the seam associated with burn-through can produce poor seam aesthetics, flaws in the structural integrity of the seam, and other problems. Furthermore, the seams formed by this method often display a ridge or other noticeable deformation in the film that is not aesthetically pleasing.

Another seam forming method employs hot melt adhesives. Problems associated with typical hot melt adhesive systems include the difficulty that the hot melt adhesive must be applied to the film just prior to the seam being formed. Hot melt adhesives are tacky only for a few seconds while they remain melted. Forming the seam must be accomplished before the hot melt adhesive resolidifies. Quick seam formation is required to avoid subsequent film processing problems, discussed previously herein, such as adhesive contamination on production equipment.

Pressure sensitive adhesives ("PSAs") have also been used to form the seam in shrink wrap films. Like hot melt adhesives, PSAs are applied to the film just prior to the seam being formed. Immediate seam formation is usually required to avoid problems associated with subsequent processing steps. If the seam is not immediately formed subsequent to adhesive application to the film, a release liner is normally used. Typical release liners are paper or polymeric structures that utilize silicon-containing and fluorine-containing materials as a release agent for shrink films. The silicon-containing or fluorine-containing component of the release liner contacts the adhesive layer. The silicon-containing or fluorine-containing material allows the release liners to separate easily from the adhesive when the shrink films are needed for use. The silicon-containing or fluorine-containing material does not strongly adhere to the adhesive and thus provides a releasable interface with the underlying adhesive while providing protection from contamination. The liners are not recyclable due to the presence of silicon and fluorine material, thus raising environmental concerns. Such release liners are suitable only for the landfill and contribute significantly to stress on the environment. Furthermore, occasional transfer to the film or substrate of material containing a silicon or fluorine component can interfere with proper adhesion at the seam, cause problems for subsequent printing operations, and other similar difficulties.

Therefore, a need exists for shrink wrap films and related methods that do not incorporate a solvent in the seaming process. A need also exists for shrink wrap films and related methods that do not incorporate a silicon-containing or fluorine-containing material as a release agent. A need also exists for shrink wrap films and related methods that are useful with low density films. Further, a need exists for shrink wrap films and related methods that leave an aesthetically pleasing seam.

SUMMARY

The difficulties and drawbacks associated with previously known seaming means and labeling strategies are overcome in the present shrink films and related combinations and methods.

The present subject matter relates to shrink films that do not include solvent-formed seams and do not incorporate silicon-containing and fluorine-containing material as a release agent. The present subject matter provides numerous benefits over typical seaming techniques. The present subject matter also relates to combinations and methods of adhering heat shrinkable films to substrates, the combinations and methods do not incorporate silicon-containing and fluorine-containing material.

In one aspect, the present subject matter provides a shrink film comprising a heat shrinkable film, an adhesive layer on the heat shrinkable film, and a water soluble layer on the adhesive layer; wherein the adhesive layer is at least partially exposed when at least a portion of the water soluble layer is dissolved.

In another aspect, the present subject matter provides a combination comprising a substrate and a shrink film applied to the substrate. The shrink film comprises a heat shrinkable film, an adhesive layer on the heat shrinkable film, and a water soluble layer on the adhesive layer; wherein the adhesive layer is at least partially exposed when at least a portion of the water soluble layer is dissolved.

In still another aspect, the present subject matter provides a method of adhering a heat shrinkable film to a substrate. The method comprises the operations of providing a shrink film comprising a heat shrinkable film, an adhesive layer on the heat shrinkable film, and a water soluble layer on the adhesive layer; dissolving at least a portion of the water soluble layer to expose at least a portion of the adhesive layer; applying the shrink film to the substrate; and shrinking the shrink film so the shrink film conforms to the contours of the substrate.

The present subject matter allows for an adhesive layer to be disposed on a heat shrinkable film at a time prior to forming a bond—either by forming a seam or by adhering a heat shrinkable film to a substrate. After all components of the shrink film are assembled, the shrink film can subsequently pass through converting equipment, be subject to handling, or go through further processing steps; all before the adhesive layer forms a bond. This further processing before bond formation is possible because the adhesive layer of the present subject matter is covered by a non-tacky water soluble layer and optional release liner. Seam formation or bonding to a substrate can be accomplished at a later stage in the production process, i.e. at a time remote from adhesive application to the heat shrinkable film.

As used herein, the terms "seal" and "seam" are used interchangeably and refer to the portions of the heat shrinkable film that are bonded together in order to form a sleeve or tube. As used herein, the term "water soluble" means a substance is able to be dissolved or solubilized by water or other polar solvent.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

These, as well as other features, aspects, and advantages of the present subject matter, will be more completely understood and appreciated by referring to the following more detailed description of the exemplary embodiments of the present subject matter in conjunction with the accompanying drawings.

DETAILED DESCRIPTION OF THE EMBODIMENTS

Figure 1:
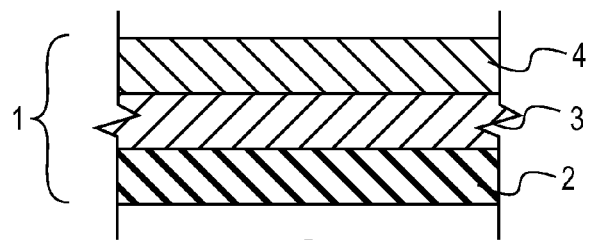
FIG. 1 is a schematic, cross sectional view of a preferred embodiment shrink film in accordance with the present subject matter.

The subject matter described herein provides a shrink film that incorporates an adhesive layer covered by a water soluble layer. The water soluble layer on the adhesive layer is non-tacky when in dry form. When the water soluble layer is dissolved, the adhesive layer is exposed and is utilized in applying the shrink film to a substrate. The adhesive layer can form the seam, adhere the shrink film to a substrate, or a combination of the two.

The dry, non-tacky water soluble layer allows for further handling or processing of the shrink film in a time period between adhesive layer application and seam formation. Because the water soluble layer is non-tacky, the seam does not have to be formed immediately after the adhesive layer is applied to the heat shrinkable film. A release liner, if incorporated, releases from the preferred water soluble layer without the use of fluorine-containing or silicon-containing material.

The present subject matter shrink films are free of solvent-formed seams, making them more environmentally friendly. Because a solvent is not used to melt the polymeric heat shrinkable film to form the seal, the use of VOCs is reduced. Use of a pressure sensitive adhesive to form the seal minimizes the problem of solvent migration away from the seal site. PET containers are thus not subject to significant solvent degradation. The adhesive layer of the present subject matter and its use are more compatible with PET containers than traditional solvents. The adhesive layer preferably does not substantially dissolve, solubilize, or otherwise degrade PET containers.

Unlike solvent seaming, a preferred adhesive will not be limited to sealing specific types of high density heat-shrinkable films and can be used on various low density polymeric heat shrinkable films. Low density film labels will thus float and separate from PET, and other high density containers during the water flotation/label separation recycling process; while the denser containers will sink. Simplified recycling efforts and reduced recycling costs are thus realized.

When exposed, the adhesive layer of the shrink film does not need to be activated and is immediately tacky. The adhesive layer provides sufficient strength to maintain the seam during film shrinkage of 70% or more. The adhesive layer does not burn through the heat shrinkable film and provides lay-flat seams with good aesthetics. If a release liner is incorporated with the films, silicon-containing and fluorine-containing materials are not required, thus allowing for the recycling of the release liners.

Shrink Films

Shrink films in accordance with the present subject matter can be provided in many forms including incorporation for use as a label, packaging means, surface protection films, graphics materials, tamper evident means, and the like. In certain embodiments, shrink films of the present subject matter comprise a heat shrinkable film, an adhesive layer disposed thereon, and a water soluble layer on the adhesive layer. In a preferred embodiment, the water soluble layer is an amorphous polyvinyl alcohol polymer.

Heat Shrinkable Film

In accordance with the present subject matter, a shrink film comprises a heat shrinkable film. The heat shrinkable film comprises a polymeric film which is substantially two-dimensional with two major surfaces. By substantially two-dimensional, it is meant an object having a significantly large size measurement in two dimensions compared to a significantly small size measurement in the third dimension. The composition of the heat shrinkable film, whether two- or three-dimensional, is not particularly limited and can comprise high or low density polymers, or combinations thereof. Low density polymers are preferred that have a density of less than 1 g/cm$^3$. This low density allows for water flotation separation from a denser substrate during recycling processes.

The preferred heat shrinkable film is comprised of a thin polymeric elastic or flexible film with thickness ranging from about 30 microns to about 100 microns or more, preferably about 35-50 microns. When heated above 22.5° C., preferably from about 40° C. to about 130° C., the heat shrinkable film shrinks from about 10% to about 70% from the size before heating.

The film is preferably continuous in that it has no perforations or pores which extend through the thickness of the film, although perforations or pores can be present. The heat shrinkable film preferably is not dissolved, solubilized, or otherwise damaged by water or other polar solvent since the shrink film of the present subject matter may be exposed to a polar solvent in order to dissolve the water soluble layer. In the case where the heat shrinkable film will potentially be damaged by water, a protective treatment or layer can be applied to the heat shrinkable film to prevent such damage. The heat shrinkable film may be coated with hydrophobic or water repellent lacquer or other agents including, but not limited to poly-vinylidene chloride, acrylates, polyurethane, epoxy resins, silicones, poly-tetra-fluoro-ethylene (for example, Teflon, a registered mark of DuPont, USA), poly-vinyl fluoride (for example, Tedlar, a registered mark of DuPont, USA), THV, a polymer of tetrafluoroethylene, hexafluoropropylene and vinylidene fluoride (for example, Dyneon, a registered mark of 3M, USA) etc. The heat shrinkable film may optionally be coated on either surface.

Preferred heat shrinkable films are single or multi-layered and include a non-halogen polyolefin material comprising one or more of medium density polyethylene ("MDPE"), polyethylene terephthalate glycol-modified ("PETG"), cyclic olefin polymers and copolymers, styrenic based polymers, low density polyethylene, linear low density polyethylene, very low (or ultra low) density polyethylene, polyethylene plastomers and elastomers such as homogeneously branched linear ethylene polymer and substantially linear ethylene polymer, medium density polyethylene and high density polyethylene), homopolymer polypropylene ("hPP") random copolymer polypropylene ("RCP"), or propylene based plastomers and elastomers.

The polyolefin component can be chosen to provide an appropriate melting point and crystallinity in order to control the shrink tension of the film. Shrink tension refers to the pull or force exerted on the seam when the heat shrinkable film contracts during heating. The higher the shrink percentage of the film, the higher the shrink tension will be, and the stronger the seam has to be to prevent seam failure. Preferably, the polyolefin resin (or blend) chosen will have a melting point below 150° C., more preferably less than 135° C., and most preferably less than 130° C.

The polyolefin component may also advantageously contain various additives as is generally known in the art. This includes materials such as inorganic fillers, conductive fillers, pigments, aroma barriers, antioxidants, acid scavengers, flame retardants, ultraviolet absorbers, processing aids, extrusion aids, slip additives, permeability modifiers, antistatic agents, antiblock additives and other thermoplastic polymers.

The preferred film also includes printing, images, or other indicia. These can be applied to either or both surfaces of the heat shrinkable film by flexographic, rotogravure, offset or digital printing techniques.

Depending on the intended use, the preferred heat shrinkable film can be oriented or non-oriented. If oriented, the preferred heat shrinkable film can be oriented in a transverse direction, a machine direction, or a combination thereof. Orienting in only one direction substantially limits the shrink in the non-oriented direction. Biaxially oriented films tend to shrink in both directions, i.e. transverse and machine directions.

Adhesive Layer

The preferred adhesive layer of the present subject matter comprises a pressure sensitive adhesive that forms a permanent bond. In one aspect, the adhesive layer bonds together two peripheral edges of the heat shrinkable film to form a tube or sleeve. The tube can be placed around a substrate and heated to shrink the tube to the contours of the substrate. In another embodiment, the adhesive layer can be used to bond the heat shrinkable film to a substrate. These aspects are incorporated in a heat shrinkable film that is in the form of a tube or in the form of a sheet, as discussed in further detail herein.

Pressure sensitive adhesives are adhesives that form a bond with the application of pressure. Solvents, water, chemical reaction, and heat are not required to activate the adhesive. The degree of bonding strength is influenced by the amount of pressure which is used to apply the adhesive to the surface. Bonding strength is also affected by substrate characteristics such as smoothness, surface energy, presence of contaminants, and the like. Pressure sensitive adhesives are usually designed for use at room temperature. They normally display a total or partial loss of bonding strength at low temperatures and shear holding ability at high temperatures.

Pressure sensitive adhesives exhibit viscoelastic properties, which are tailored to ensure proper adhesion. Pressure sensitive adhesives are designed to balance their tendency to flow (adhesive forces) and their resistance to flow (cohesive forces). Pressure sensitive adhesives form a bond to a surface because their adhesive forces are such that they flow, or wet the substrate. The bond maintains strength because the cohesive forces of the pressure sensitive adhesive are such that they resist flow when stress is applied to the bond.

Once the substrate and the pressure sensitive adhesive are in proximity, there are also molecular interactions, such as van der Waals forces involved in the bond, which contribute significantly to the bond strength.

Pressure sensitive adhesives are usually composed of elastomeric polymers with or without tackifiers. A variety of polymers have been used to manufacture pressure sensitive adhesives; for example, acrylic and methacrylic ester homo- or copolymers, butyl rubber-based systems, silicones, nitriles, styrene block copolymers, ethylene-vinyl acetate, urethanes, vinyl esters and amides, olefin copolymer materials, natural or synthetic rubbers, and the like.

Pressure sensitive adhesives are typically classified in one of two categories, permanent and removable. Permanent pressure sensitive adhesives are adhesives which do not allow for the removal of an adhesive article from a substrate without considerable damage to the adhesive article, adhesive failure at the article surface, cohesive failure in the body of the adhesive, or residual transfer of the adhesive to the substrate.

The adhesion of removable pressure sensitive adhesives is considerably lower, allowing removal of the adhesive article from the substrate even after a protracted period of contact. Removal is accomplished without significant damage to the adhesive article or substrate. Removable pressure sensitive adhesives form a temporary bond and can be removed without leaving any residue on the substrate.

In accordance with the present subject matter, the adhesive layer may be applied directly or by a carrier to the heat shrinkable film. Depending upon the utility, the adhesive layer can be applied to a heat shrinkable film or carrier using techniques such as spraying, wire coating, knife coating, Meyer Bar coating, curtain coating, extrusion coating, gravure print coating, reverse gravure print coating, or the like.

A preferred embodiment for the adhesive layer of the present subject matter comprises a permanent pressure sensitive adhesive. The adhesive layer will preferably not chemically react with or dissolve the water soluble layer. The adhesive layer can be soluble in aqueous solutions but is preferably not soluble in aqueous solutions. The adhesive layer is preferably an emulsion adhesive comprised of a solvent acrylic polymer.

Other adhesives can be used; such as a polyurethane adhesive, a rubber adhesive, or the like. The adhesive layer should have a glass transition temperature less than about 10° C. below use temperature, typically less than about 30° C. below use temperature. As used herein, the phrase "use temperature" is the temperature at which the adhesive is normally used for bonding. Use temperature is typically ambient (22.5°) but may be 0° C. or less for low temperature applications and higher than 22.5° C. for high temperature applications.

The copolymers for the adhesive of the instant subject matter can be stabilized against UV and oxidative degradation by using UV stabilizers and antioxidants. Fillers, colorants, tackifiers, plasticizers, oils, and the like, may also be added.

Upon removal of a release liner from a shrink film, the adhesive layer will preferably retain a substantial portion of the water soluble layer from the release liner. This is due to the bond strength being greater between the water soluble layer and the adhesive layer than the bond strength between the water soluble layer and the release liner. When the water soluble layer is substantially dissolved, the adhesive layer provides adhesion between the heat shrinkable film and the substrate.

Figure 4:
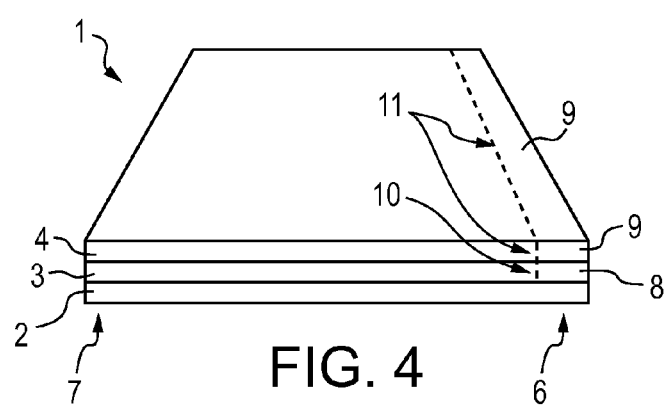
FIG. 4 is a schematic, detailed perspective view of another preferred embodiment shrink film.

In another embodiment, two or more different adhesives can be applied to the heat shrinkable film. For example, and with reference to FIG. 4, a peripheral portion 8 of the adhesive layer 3 can comprise a permanent PSA, for forming a permanently bonded seam. A remainder of the adhesive layer 3—the portion not comprising the peripheral portion 8—can comprise an activatable adhesive that can be activated before, during, or after the shrink film is applied to a substrate, to enhance the attachment of the film to a substrate. FIG. 4 is described in greater detail herein.

The adhesive layer will remain substantially affixed to the heat shrinkable film even upon exposure to a polar solvent. The adhesive layer has a thickness from about 1 micron to about 20 microns or more, and preferably has a thickness of about 10 microns.

The PSA layer can be disposed on a heat shrinkable film in a fashion suitable for a particular application. For example, the adhesive layer can be disposed over portions of a heat shrinkable film or over the entire heat shrinkable film. The adhesive layer disposed on the heat shrinkable film can be patterned, continuous, or applied as discrete islands of adhesive. The adhesive layer can have relative uniform thickness or can vary. In a preferred embodiment, the adhesive layer is disposed as a continuous layer with relative uniform thickness on a peripheral portion of the heat shrinkable film. In another embodiment, the adhesive layer is disposed as a continuous layer with relative uniform thickness on one entire surface of the heat shrinkable film.

Regardless of the adhesive chosen for the adhesive layer, it is preferred that the adhesive layer be insoluble in water. To choose an adhesive that could dissolve in water would lead to undesirable consequences. When water is used as the polar solvent and brought into contact with the water soluble layer to dissolve it, a water soluble adhesive could partially or totally dissolve; leaving a residue on the heat shrinkable film and preventing optimum adhesion. The present subject matter and related embodiments alleviate this problem by incorporating an adhesive that does not readily dissolve in water.

The adhesive should also be chosen to correspond to the shrink percentage of the film. The bond strength of the adhesive should be greater than the shrink tension in the film to maintain the integrity of the seam.

Water Soluble Layer

A preferred shrink film in accordance with the present subject matter includes a water soluble layer. The water soluble layer is disposed over the adhesive layer. The water soluble layer is preferably in dry form and substantially non-tacky. The dry water soluble layer, without a release liner disposed thereon, allows for handling or processing of the shrink film. In one aspect that incorporates a release liner, the water soluble layer is utilized as a release agent for the adhesive layer. The water soluble layer can be disposed on the release liner or disposed directly on the adhesive layer.

When exposed to a polar solvent, such as water, the water soluble layer is dissolved to expose the underlying adhesive layer. If a release liner is used for the shrink film, the water soluble layer preferably remains substantially disposed over the adhesive layer when a release liner is removed.

A preferred water soluble layer comprises a polyvinyl alcohol ("PVOH") polymer with chemical formula $(C_2H_4O)_x$. PVOH is resistant to oil, grease, and solvents. PVOH is a solid that is fully degradable and dissolves relatively quickly. It is considered non-toxic. When dry, PVOH is non-tacky and is a relatively rigid material that can enhance the dispensing speeds of shrink films in a mechanical production process, allowing for more conformability at lower caliper.

A more preferred water soluble layer comprises an amorphous vinyl-alcohol copolymer resin. Amorphous indicates a condition in which polymer molecules are not crystallized but are randomly structured. Alternatively, the PVOH layer can comprise a crystalline or semi-crystalline PVOH that is partially or fully hydrolyzed, or combinations of a crystalline, semi-crystalline, and amorphous PVOH. An example of a preferred amorphous polyvinyl alcohol polymer is Nichigo G-Polymer provided by Sourus LLC, 3930 Ventura Drive, #355, Arlington Heights, Ill. 60004, USA; a subsidiary of Nippon Gohsei Synthetic Chemical Industry, Osaka Fukoku Seimei Building, 2-4, Komatsubara-cho, Kita-ku, Osaka 530-0018, Japan.

The water soluble layer can be applied to the release liner or directly to the adhesive layer by any conventional means including, lamination, extrusion, deposition, spray coating, dip coating, and the like.

The thickness of the water soluble layer will affect properties of the shrink film and will determine the amount of polar solvent needed to dissolve the water soluble layer. A thicker water soluble layer requires more polar solvent for dissolution and provides a longer dissolution time, more time before the adhesive layer is exposed, and thus a longer time before the shrink film can be applied to a substrate. A thinner water soluble layer requires less polar solvent for dissolution, provides a shorter dissolution time, and thus more quickly exposes the adhesive layer. Furthermore, the water soluble layer may be so thin that it may not adequately cover the adhesive layer to allow handling of the shrink film. The water soluble layer is preferably applied at a rate, measured by dry weight of the water soluble component, between 0.1 grams per square meter (gsm) to about 20 gsm, and more preferably between about 1 gsm to about 3 gsm.

In one embodiment, the water soluble layer is disposed on the entire adhesive layer. In another embodiment, the water soluble layer is disposed on a portion of the adhesive layer.

In one aspect of the present subject matter, the release liner is removed from the shrink film before the shrink film is applied to a substrate. The water soluble layer will adhere more to the adhesive layer than to the release liner. Thus, the water soluble layer will be left on the adhesive layer upon removal of the release liner. That is, the water soluble layer is transferred from the release liner to the adhesive layer when the release liner is removed from the shrink film. Thereafter, the water soluble layer is dissolved with a polar solvent. Because the water soluble layer preferably displays a very weak bond to the release liner, mechanically produced shrink films can be produced at higher dispensing speeds and with less stiffness.

Release Liner

In one preferred embodiment of the present subject matter, the shrink film has a release liner. The release liner is removed prior to dissolving the water soluble layer to expose the adhesive layer. The release liner provides protection for the shrink film and prevents premature exposure of the water soluble layer or the adhesive layer to the surrounding environment. A release liner protects against contamination by dirt, liquids, or other elemental exposure. Inadvertent contact or exposure to environmental elements can prematurely cause the dissolution of the water soluble layer, decrease the tackiness of the adhesive layer, and prevent the desired adhesion. The release liner maintains the water soluble layer and adhesive tackiness of the adhesive layer.

The release liner also allows for more aggressive handling of the shrink film prior to application to a substrate than that allowed by the dry, non-tacky water soluble layer alone. For example, the release liner provides more protection for the shrink film during lamination, printing, converting, packaging, handling, or shipping than does the dry, non-tacky water soluble layer alone. Handling of the shrink film can include passing the shrink film through converting equipment such as rollers, die cutting individual shrink films from a roll, packaging shrink films, printing on the heat shrinkable film, and other manufacturing processes. The release liner provides stiffness to the shrink film to facilitate these steps. The release liner may cover all or a portion of the water soluble layer and adhesive layer.

Typical liner materials are super calendered kraft paper, glassine, clay coated kraft paper, machine finished kraft paper, machine glazed paper, biaxially oriented polyethylene terephthalate film, polypropylene film, polyethylene film, biaxially oriented polypropylene film, polyester, acrylic, nylon, cellulosic derivative, butylene; isobutylene; high, medium, low, and linear low density polyethylene; ethylene vinyl acetate; ethylene acrylic add; ethylene methyl (meth) acrylate; ethylene butyl acrylate; polypropylene; ethylene/propylene copolymers; and impact resistant ethylene/propylene copolymers and combinations thereof.

In a preferred embodiment, the release liner comprises a polypropylene. The release liner has a thickness from about 5 microns to about 20 microns or more, and preferably has a thickness of about 10 microns.

Optional Layers and Treatments

The shrink films of the present subject matter can include other layers or treatments for specific intended uses and include printing receptive layers or treatments, hydrophobic layers or treatments, additional laminated heat shrinkable film layers, or the like. Examples include priming, printing, hydrophobic treatments, etc.

Representative examples of preferred shrink films in accordance with the present subject matter are depicted in the accompanying figures. These examples are not meant to limit the scope of the subject matter but are meant to provide context to the description provided herein.

Figure 2:
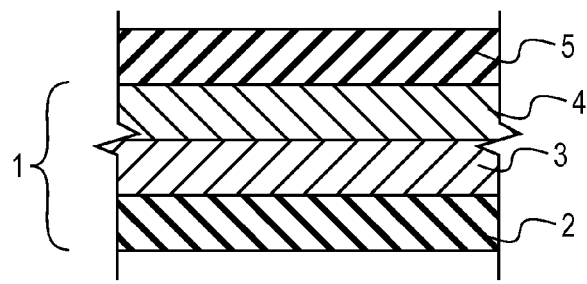
FIG. 2 is a schematic, cross sectional view of a preferred embodiment shrink film, with a release liner.

Schematic, cross sectional views of two preferred embodiments of a shrink film in accordance with the present subject matter are shown in FIGS. 1 and 2. The shrink film 1 comprises a heat shrinkable film 2 having an adhesive layer 3 disposed thereon. A water soluble layer 4 covers the adhesive layer 3.

In FIG. 2, a release liner 5 is also incorporated. The release liner covers the water soluble layer 4 and protects the water soluble layer. The shrink film 1 in FIG. 2 is such that upon removal of the release liner 5, the water soluble layer 4 remains substantially disposed on the adhesive layer 3. The release liner 5 of the present subject matter is recyclable because it is free from traditional silicon-containing and fluorine-containing release agents. The release liner 5 of the present subject matter utilizes the water soluble layer 4 that is in dry form and non-tacky. The water soluble layer 4 acts as the release agent for the release liner 5 and replaces traditional silicon-containing or fluorine-containing release agents.

Figure 3:
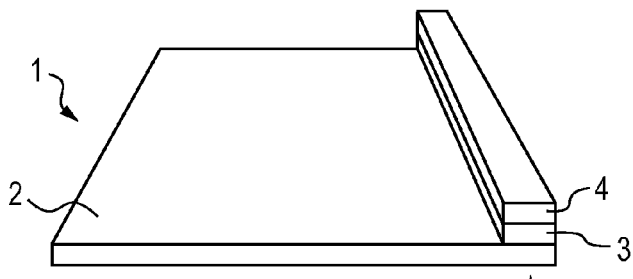
FIG. 3 is a schematic, detailed perspective view of a preferred embodiment shrink film.

In one embodiment in accordance with the present subject matter, and as depicted in FIG. 3, the shrink film 1 comprises an adhesive layer 3 disposed on only a peripheral portion 6 of the heat shrinkable film 2. Accordingly, the water soluble layer 4 is disposed over the adhesive layer 3 along only one peripheral portion 6 of the heat shrinkable film 2.

Figure 5:
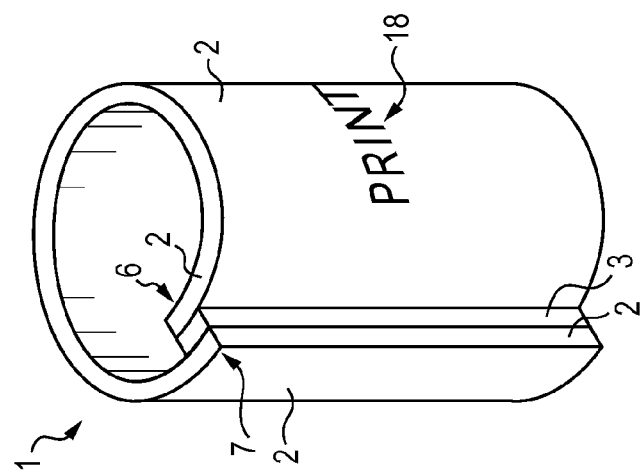
FIG. 5 is a schematic, detailed perspective view of the shrink film of FIG. 3, bonded to form a tube.

FIG. 5 depicts the embodiment of FIG. 3, in the form of a tube or sleeve. The adhesive layer 3 of the shrink film 1 is exposed when the water soluble layer 4 has been dissolved. The adhesive layer 3 is then used to bond one peripheral portion 6 of the heat shrinkable film 2 to another peripheral portion 7 of the heat shrinkable film. The two peripheral portions 6/7 bond together to form a tube. It will be understood that the shrink film 1 of this and other embodiments can be rolled in either of two ways upon itself to form a tube, such that peripheral portions 6/7 are transposed, i.e. peripheral portion 6 can be on the outside of the tube while peripheral portion 7 is on the inside of the tube. Also depicted in FIG. 5 are indicia 18 incorporated in the shrink film 1.

In another particular embodiment in accordance with the present subject matter, and as depicted in FIG. 4, the shrink film 1 comprises an adhesive layer 3 covering one surface of the heat shrinkable film 2. Accordingly, the water soluble layer 4 covers the adhesive layer 3 on one surface of the heat shrinkable film 2. Also indicated are two peripheral portions 6/7 of the heat shrinkable film 2. Depicted is a peripheral portion 8 of the adhesive layer 3, separated from the remainder of the adhesive layer 3 by a dotted line 10. Depicted is a peripheral portion 9 of the water soluble layer 4, separated from the remainder of the water soluble layer 4 by a dotted line 11.

Although the adhesive layer 3 is depicted in FIGS. 3 and 4 as a continuous layer with uniform thickness, it is also within the scope of the present subject matter that the adhesive layer 3 is patterned, intermittent, or layered on the heat shrinkable film 2. Additionally, the adhesive layer 3 can have varying thicknesses.

Figure 6:
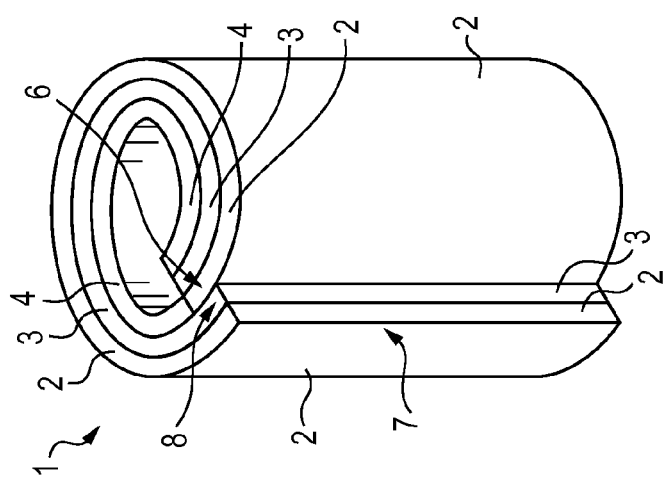
FIG. 6 is a schematic, detailed perspective view of the shrink film of FIG. 4, bonded to form a tube.
Figure 7:
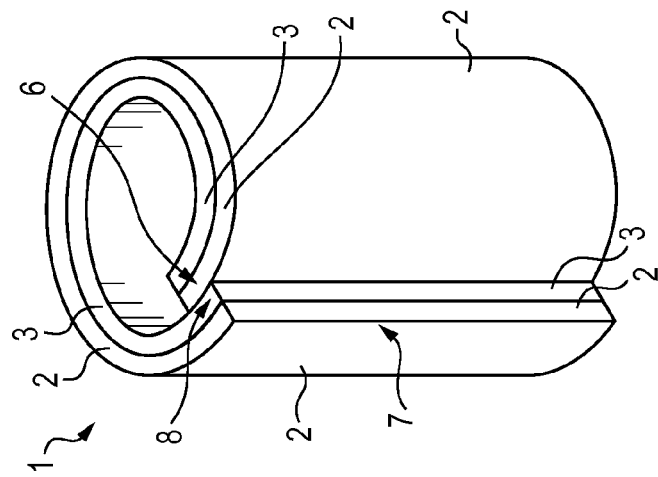
FIG. 7 is a schematic, detailed perspective view of the shrink film of FIG. 6, bonded to form a tube, with the adhesive layer revealed.

FIG. 6 and FIG. 7 depict the embodiment in FIG. 3, in the form of a tube or sleeve. In FIG. 6, only the peripheral portion 8 of the adhesive layer 3 has been exposed by dissolving only the peripheral portion 9 (shown in FIG. 4 but not depicted in FIGS. 6 and 7) of the water soluble layer 4. The exposed peripheral portion 8 of the adhesive layer 3 bonds two peripheral portions 6/7 of the heat shrinkable film 2 together to form the shrink film 1 into a tube.

In FIG. 7, the entire adhesive layer 3 of the shrink film 1 is exposed because the entire water soluble layer 4 has been substantially dissolved. Peripheral portion 8 of the adhesive layer 3 bonds two peripheral portions 6/7 of the heat shrinkable film 2 to form a tube. The remaining portion of the adhesive layer 3—that portion not including the peripheral portion 8—is used to increase bonding between the shrink film 1 and an associated substrate (not shown) to which it will be attached.

It will be appreciated that the entire water soluble layer 4 can be dissolved at once or portions of the water soluble layer 4 can be dissolved at separate times. For example, FIG. 6 depicts only a peripheral portion 9 of the water soluble layer 4 dissolved. A remainder of the water soluble layer 4—that portion not including the peripheral portion 9—or parts thereof, can be later dissolved to reveal more of the adhesive layer 3. This circumstance is shown in FIG. 7, where the entire water soluble layer 4 is not depicted because it has been substantially dissolved.

For industrial mechanical processing of individual shrink films, the heat shrinkable film can comprise a continuous rolled film. A final layered shrink film composition is formed by disposing other component layers to the heat shrinkable film. The shrink films of the present subject matter can be produced by a roll-fed or a shrink sleeve process.

In shrink sleeve labeling, shrink sleeve or tube is formed from a continuous rolled film. The rolled film is unwound, folded upon itself, and two opposite peripheral portions are continuously bonded together to fashion a continuous tube or sleeve. The continuous tube can be wound on a core for later application to a substrate. When application is desired, the continuous wound tube is unrolled from the core, cut into lengths to form individual shrink sleeve labels, and slipped over a container. The shrink sleeve labels are then heated. The shrink sleeve labels contract and conform to the contours of the underlying substrate.

In roll-fed shrink labeling, a continuous rolled film is unwound from a core and cut into individual flat sheets. The individual sheets can optionally be stored for later application to a substrate. When application is desired, the sheets are formed into a tube. Tube formation is accomplished by adhering a leading edge of the sheet to the substrate. The sheet is wrapped around the substrate. The trailing edge of the sheet is bonded to the leading edge of the sheet to form a seam in the film and thus creating a tube or sleeve around the substrate. The substrate and label are heated and the label shrinks and conforms to the contours of the underlying substrate. In an alternative method, the trailing edge of the sheet can be bonded directly to the substrate rather than to the leading edge of the sheet, and then shrunk.

A preferred embodiment shrink film of the present subject matter is a pressure sensitive shrink film. The pressure sensitive shrink film comprises a printable, heat shrinkable film with a permanent PSA layer. An amorphous PVOH polymer layer covers the PSA layer. A release liner, free of silicon-containing and fluorine-containing material can also be incorporated. When the PVOH layer is dissolved, the PSA layer is exposed and is utilized in applying the shrink film to a substrate.

Combinations

In accordance with one preferred embodiment of the present subject matter, a shrink film is applied to a substrate. The shrink film comprises a heat shrinkable film, an adhesive layer on the heat shrinkable film, and a water soluble layer on the adhesive layer; wherein the adhesive layer is at least partially exposed when at least a portion of the water soluble layer is dissolved.

The substrate is not particularly limited. Various substrates are contemplated by the present subject matter and should not be limited by the figures. The substrate(s) can be any item to which it is desired a shrink film be applied. Non-limiting examples include one or more containers, food items, household goods, tools, instruments, furniture, consumer items, industrial items, mechanized items such as cars or boats, consumable items, lumber, construction materials, raw materials, or the like.

Figure 8:
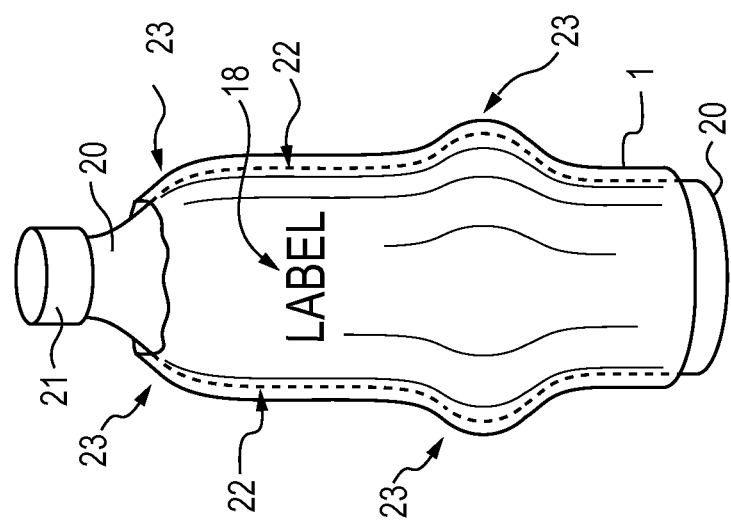
FIG. 8 is a schematic, perspective view of a preferred embodiment shrink film applied to a substrate.

In one preferred embodiment, the shrink film preferably is wrapped completely around the substrate. On aspect of this embodiment is depicted in FIG. 8 which shows a shrink film 1 wrapped completely around a substrate 20 in the form of a bottle having various compound contours 23 and a cap 21. By compound or complex contour it is meant a surface of a substrate with contours in at least two directions. The shrink film 1 is shown as a label for the substrate 20 and having indicia 18 thereon. The dotted lines 22 show the shape of the substrate 20 underneath the shrink film 1. The shrink film 1 conforms around the contours 23 to the shape of the substrate 20.

Figure 9:
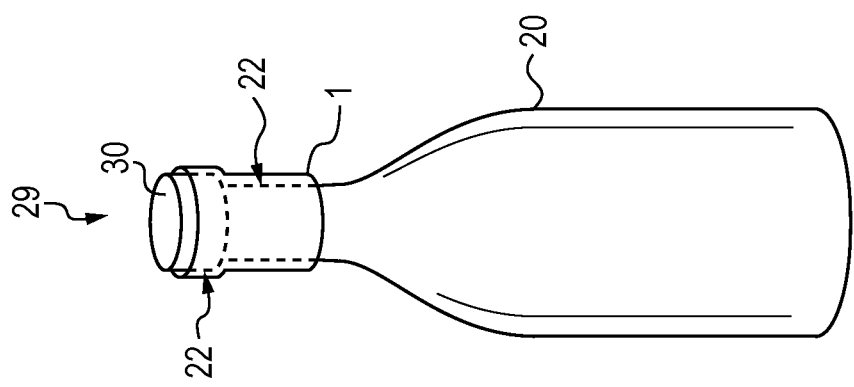
FIG. 9 is a schematic, perspective view of another preferred embodiment shrink film applied to a substrate.

FIG. 9 depicts another aspect where the shrink film 1 is wrapped completely around the substrate 20 in the form of a bottle. The shrink film 1 is shown in FIG. 9 as a neck band that acts a tamper-evident feature for a substrate 20. The substrate 20 has an opening 29 that is covered by a cap 30. The shrink film 1 is at least partially covering the cap 30. The dotted lines 22 represent the shape of the substrate 20 and cap 30 underneath the shrink film 1. The shrink film 1 conforms around the shape of both the substrate 20 and the cap 30. The shrink film 1 must be removed from the cap 30 prior to removing the cap 30 from the substrate 20. Thus, an initial opening of the substrate 20 by removing the cap 30 is indicated by removal or damage to the shrink film 1. It is also within the scope of the present subject matter that the shrink film neck band used as a tamper evident feature completely covers the opening or cap of the container.

Figure 10:
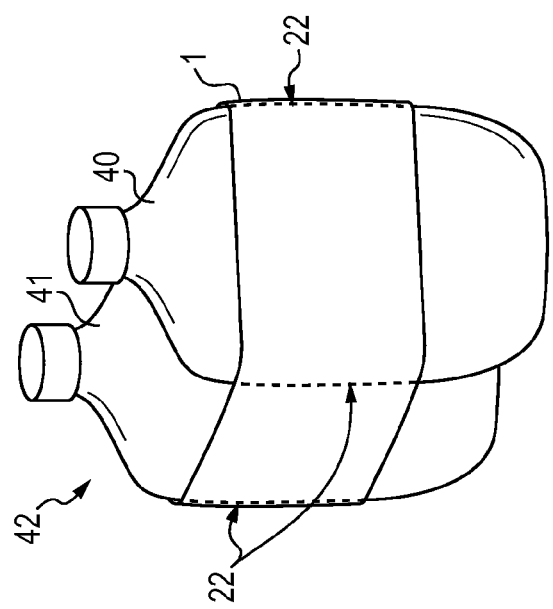
FIG. 10 is a schematic, perspective view of another preferred embodiment shrink film applied to two substrates.

FIG. 10 depicts still another aspect where the shrink film 1 is wrapped completely around the substrate. A shrink film 1 is shown in FIG. 10 as packaging means to couple two containers 40/41 together. This is commonly referred to as a multi-pack. The multi-pack 42 can be shipped, handled, and sold as one unit. The dotted lines 22 represent the shape of the containers 40/41 underneath the shrink film 1. The shrink film 1 conforms around the shape of the containers 40/41. Also within the scope of the present subject matter is the coupling of three or more substrates with the shrink film. This may be accomplished with the optional use of a secondary packaging means, such as a tray, to help hold the items together in one unit.

It is within the scope of the present subject matter that the shrink film wrap completely surround the entire perimeter of the substrate to completely cover the substrate. The shrink film will be bonded to itself in such as way as to encapsulate the substrate. When heated, the shrink film will shrink completely around the substrate and conform to the contours of the substrate. Seam formation, and film structure and composition are similar to other embodiments described herein.

It is also within the scope of the present subject matter to combine two or more aspects into one embodiment. For example, a shrink film sleeve label can be extended from the label area on the body of the container to at least partially cover an opening in the container to provide a tamper-evident feature like that provided by a neck band shrink sleeve. An altered or removed neck band portion of the shrink label will provide a visual indication of an initial opening of the container.

Figure 11B:
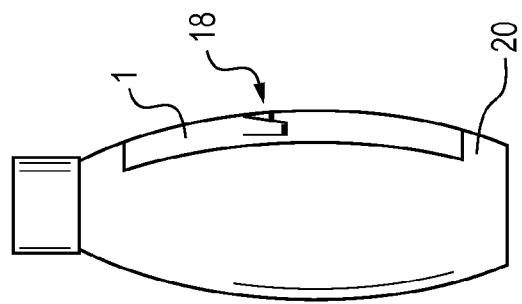
FIGS. 11A and 11B are schematic, perspective views of another preferred embodiment shrink film applied to a substrate.
Figure 11A:
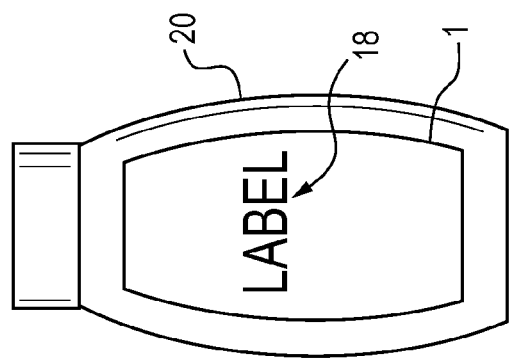

In another preferred embodiment, the shrink film is not wrapped completely around the substrate. FIGS. 11A and 11B depict a representative aspect of this embodiment. FIG. 11A depicts a front view of a shrink film 1 in the form of a sheet applied to a substrate 20 in the form of a container having a compound or complex contoured surface. FIG. 11B depicts a side view of the same shrink film 1 sheet and substrate 20.

The shrink film 1 sheet has indicia 18 and is being used as a label for the substrate 20. In this aspect, it is contemplated that an adhesive layer is disposed on an entire surface of the shrink film 1 sheet and bonds the shrink film 1 sheet to the substrate 20 both prior to and after shrinking the heat shrinkable film to the contours of the substrate 20. Heating and contracting the shrink film 1 allows the label to lie flat against the substrate 20, rather than forming darts or pleats in the sheet as could potentially happen with a non-heat shrinkable label. In this and other embodiments, it is also contemplated that a substrate without complex contoured surfaces can be used.

A preferred embodiment combination comprises a container for a liquid with a shrink film, used as a label, wrapped completely around the container. The shrink film has a permanent PSA adhesive layer at a periphery of the heat shrinkable film for making a permanent bond at a seam in the shrink film. The shrink film, in the form of a tube, has been heated to conform to the contours of the container. The label is applied to the container by any of the preferred methods discussed herein. Such methods are fully incorporated herein.

While not being bound to any particular theory, it is believed that when amorphous PVOH is used as the water soluble layer in a shrink film that is attached to a substrate, that the amorphous PVOH polymer remains at or near the interface between the substrate and the shrink film even after the amorphous PVOH is dissolved. It is believed that if the PSA adhesive layer is water based, the dissolved amorphous PVOH polymer will mix with the adhesive layer and expose the adhesive layer. The mixed dissolved amorphous PVOH does not significantly diminish the bonding strength of the PSA adhesive layer and allows a permanent bond to be formed.

If the PSA adhesive layer is solvent based, it is believed that the dissolved amorphous PVOH polymer dries and coalesces into small isolated regions on the surface of the adhesive layer. The coalesced dissolved amorphous PVOH polymer remains at the substrate-adhesive interface but provides sufficient contact between the substrate and the adhesive layer to form a permanent bond. In any event, the dissolved amorphous PVOH polymer will preferably not substantially affect the bonding strength of the adhesive layer.

Methods

The present subject matter also provides methods for attaching a heat shrinkable film to a substrate. The methods do not utilize solvent seams and can be incorporated with low density polymeric films. The methods allow for further handling or processing of the shrink films subsequent to adhesive application. One preferred method provides a release liner for the shrink film that is recyclable because no silicon-containing or fluorine-containing materials are used as release agents.

The preferred methods in accordance with the present subject matter comprise providing a shrink film, dissolving at least a portion of the water soluble layer, applying the shrink film to the substrate, and shrinking the shrink film.

In the providing operation, a shrink film comprises a heat shrinkable film, an adhesive layer disposed on the heat shrinkable film, and a water soluble layer on the adhesive layer. In another aspect, the shrink film further has a release liner covering the water soluble layer. The preferred composition, structure, and advantages of the heat shrinkable film, of the adhesive layer, of the water soluble layer, and of the release liner have been previously disclosed and are incorporated herein by reference. The water soluble layer is preferably in dry form and non-tacky. More preferably, the water soluble layer comprises an amorphous PVOH polymer. In one preferred aspect, the adhesive layer is disposed on only a peripheral portion of the heat shrinkable film. In another preferred aspect, the adhesive layer substantially covers one surface of the heat shrinkable film.

In one aspect, the providing operation includes providing a shrink film that has a release liner, free of silicon-containing and fluorine-containing material, covering the water soluble layer. The release liner has been previously described and that description is incorporated herein. In this aspect, the method includes removing the release liner from the shrink film to reveal the water soluble layer. The shrink film is such that upon removal of the release liner, the water soluble layer will remain substantially disposed on the adhesive layer. The dry, non-tacky water soluble layer acts as a release agent between the release liner and the adhesive layer. The water soluble layer can be directly applied to the adhesive layer, or applied to the release liner and then contacted to the adhesive layer. If no release liner is used, the shrink film—with the adhesive layer and the water soluble layer—can be rolled or otherwise stacked upon itself for storage or shipment before being applied to a substrate. In this aspect, the shrink film simply can be unrolled or unstacked to expose the water soluble layer. The heat shrinkable film is used as the release liner and the water soluble layer can be coated on the heat shrinkable film on the surface opposite from the adhesive layer. The water soluble layer will release from the heat shrinkable film and remain in contact with the adhesive layer upon unwinding the rolled layered product.

The release liner is separated from the water soluble layer thereby exposing the water soluble layer that is in contact with the adhesive layer. The water soluble layer has a greater bonding strength with the adhesive layer than with the release liner and therefore, the water soluble layer remains bonded to the adhesive layer upon removal of the release liner. Preferably, a substantial portion of the water soluble layer that is in contact with the adhesive layer will remain in contact with the adhesive layer upon removal of the release liner. More preferably, the entire water soluble layer that is in contact with the adhesive layer will remain bonded to the adhesive layer upon removal of the release liner. Also within the scope of the present subject matter it is contemplated that a small portion of the water soluble layer will remain in contact with the adhesive layer upon removal of the release liner, thereby leaving a larger portion of the water soluble layer removed with the release liner. When peeled from the shrink film, the release liner is preferably substantially free of the water soluble layer, and is also free of silicon-containing and fluorine-containing material to allow for recycling of the release liner.

In the dissolving operation, at least a portion of the water soluble layer is dissolved by bringing a polar solvent into contact with the water soluble layer. The polar solvent can be brought into contact with the water soluble layer by any conventional means such as spraying, rolling, painting, dipping, microencapsulation, and the like. In microencapsulation techniques, the polar solvent is disposed in tiny microcapsules. The microcapsules release the polar solvent upon an external trigger such as pressure, heat, UV radiation, or the like. The microcapsules can be integrated into or on the adhesive layer, the water soluble layer, or by other means so that the polar solvent, once released from the microcapsules, will dissolve the water soluble layer to expose the adhesive layer. In a preferred embodiment, the polar solvent is sprayed onto the water soluble layer.

As the water soluble layer dissolves, the underlying adhesive layer is gradually revealed. Although not restricted to such, water is preferably used as the polar solvent to dissolve the water soluble layer. The water can be of any type. Preferably liquid water that has been purified by distilling, deionization, or by reverse osmosis is used. Non-limiting representative results of the dissolving operation are depicted in FIGS. 5, 6 and 7. FIGS. 5 and 7 do not depict a water soluble layer on the shrink film 1 because the entire water soluble layer has been substantially dissolved. As discussed herein, the water soluble layer can be dissolved all at once or portions thereof dissolved at separate times. FIG. 6 shows only a peripheral portion of the water soluble layer 4 having been dissolved, thus exposing a peripheral portion 8 of the adhesive layer 3.

The amount of the polar solvent used in the dissolving operation is dependent on the thickness or loading of the water soluble layer. The water soluble layer will preferably substantially dissolve and more preferably, will completely dissolve. It is also within the scope of the present subject matter and contemplated that only a small portion of the water soluble layer is dissolved as long as the adhesive layer can form an adequate bond at the seam and/or to the substrate. Regardless of the proportion of the water soluble layer that is dissolved in the dissolving operation, the adhesive layer should be revealed such that the adhesive layer can form a permanent bond.

In the applying operation, the exposed portion of the adhesive layer is used to form a bond. In one aspect, the bond can be formed between two peripheral portions of the heat shrinkable film to form a tube or sleeve. This aspect is depicted in FIGS. 5, 6 and 7. Peripheral portions 6/7 of the heat shrinkable film 2 are bonded together by the adhesive layer 3 to form a tube or sleeve. In this and other embodiments of the present subject matter, it will be understood that one or more non-peripheral portions of the heat shrinkable film can be bonded together to form a tube. Parts of the heat shrinkable film outside the tube can be trimmed away. Once formed, the shrink film sleeve is placed around a substrate. In this aspect the sleeve can be formed before the shrink film is wrapped around a substrate as in shrink sleeve labeling methods or can be formed in situ such as in roll-fed shrink labeling techniques as previously discussed herein.

In another aspect, the adhesive layer can form the bond between the heat shrinkable film and the substrate. This aspect is depicted in FIGS. 11A and 11B where the shrink film label 1 is in the form of a sheet that does not wrap completely around the substrate. FIGS. 11A and 11B depict the sheet being applied as a label to a substrate 20. The exposed adhesive layer is brought into contact with the substrate to adhere the heat shrinkable film to the substrate.

It is within the scope of the present subject matter that individual shrink films, whether in the form of a sheet or a sleeve, can be formed from a roll of heat shrinkable film. In this process, the heat shrinkable film is rolled out, coated, optionally seamed, cut into individual labels, and applied to a substrate. The film is then heated to conform to the surface contours of the substrate. Typical die cut processes that form individual sleeves or sheets do not utilize 100% of the rolled film of the final layered shrink film composition and a waste matrix component is produced. The advantage of the present subject matter is that silicon-containing and fluorine-containing material are not utilized as part of the release liner or otherwise used for the final layered composition. Silicon and fluorine prevent recycling of release liners or shrink films. Thus, the release liner or shrink films of the present subject matter—whether as part of the waste matrix component or as part of a die cut individual shrink film—is fully recyclable.

In the shrinking operation, the shrink film is heated to cause the sleeve or sheet to shrink and conform to the surface contours of the substrate. The heating process can be accomplished with hot air, infra-red radiation, a steam tunnel, an oil bath, a water bath or the like. The substrate to which the label is conformed is not particularly limited and can comprise one or more containers, surfaces, materials, tools, etc. that is flat or contoured, and smooth or rough. A practical consideration for the substrate is how tolerant the substrate is to heat that is applied in the shrinking operation. Substrates with low tolerances for heat may require exposure to a relatively low temperature for a relatively long period of time to shrink the film. Substrates with better tolerances for heat may be exposed to a relatively higher temperature for a relatively shorter period of time to shrink the film. Also, when the shrink film is in the form of a sheet, substrate interaction with the adhesive layer is also a consideration. The adhesive layer should provide a sufficient bond to the substrate for a chosen application. The type of substrate will affect the choice of the composition for the adhesive layer and the type of polar solvent used to dissolve the water soluble layer.

Other additional operations can be incorporated into the preferred methods. Non-limiting examples include priming, printing, pre-heating, corona treatment, cooling, varnishing, and/or repositioning operations. Priming and printing operations can be used to add printing, images, or other indicia to the shrink film. A pre-heating operation can increase the rate at which the water soluble layer dissolves in a polar solvent. A cooling operation can bring the film or combination back to ambient temperature. A varnishing operation can add a protective layer to the printed indicia on the shrink film. A repositioning operation can be used to reclaimed substrates with misaligned heat shrinkable films and to properly align the heat shrinkable films to the substrates.

The operations of the preferred methods can be tailored for each individual scenario and can be carried out by machine such as by a mechanized labeling machine, or can be carried out by hand utilizing individual shrink films.

The preferred methods produce lay-flat, solvent-free seams that are aesthetically pleasing with no film crimps, seam failures, or other irregularities that detract from the overall appeal of the shrink film.

A preferred embodiment method in accordance with the present subject matter is a method of attaching a pressure sensitive shrink film label to a bottle. The pressure sensitive shrink film comprises a heat shrinkable film with printing, images, or other indicia, a permanent PSA layer on only a peripheral portion of the heat shrinkable film, and/or an amorphous PVOH polymer layer disposed over the PSA. A release liner is present and covers the amorphous PVOH. The method includes removing the release liner from the shrink film to thereby expose the amorphous PVOH polymer layer. Water is sprayed on the exposed amorphous PVOH polymer layer to dissolve the amorphous PVOH polymer layer and expose the PSA layer. A seam is formed in the shrink film by permanently bonding two peripheral portions of the heat shrinkable film together to thereby form a tube. The tube is then slipped over the bottle and heated. The film shrinks and conforms to the surface contours of the bottle. The seam on the label lies flat on the bottle and is aesthetically pleasing with no crimps, seam failures, or the like.

Many other benefits will no doubt become apparent from future application and development of this technology.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scopes of the claimed subject matter, as expressed in the appended claims.

What is claimed is:
1. A shrink film comprising:
a heat shrinkable film;
an adhesive layer on the heat shrinkable film;
a water soluble layer disposed directly on the adhesive layer;

wherein at least a portion of the adhesive layer is exposed, the heat shrinkable film configured in a tube form by the exposed adhesive layer bonding at least two peripheral portions of the heat shrinkable film together.

2. The shrink film of claim 1 further comprising a release liner covering the water soluble layer, the release liner being free of silicon-containing and fluorine-containing material; and wherein the water soluble layer remains substantially disposed on the adhesive layer upon removal of the release liner from the shrink film.

3. The shrink film of claim 1 wherein the release liner is selected from the group consisting of paper, a polymeric film, and combinations thereof.

4. The shrink film of claim 3 wherein the release liner includes the polymeric film, and the polymeric film comprises polyethylene terephthalate.

5. The shrink film of claim 1 wherein the tube is configured to be placed around an associated substrate and shrunk to conform to the contours of the substrate.

6. The shrink film of claim 1 wherein the entire adhesive layer is exposed and a portion of the adhesive layer, not bonding at least two peripheral portions of the heat shrinkable together, is capable of forming an adhesive bond with the substrate.

7. A method for attaching a heat shrinkable film to a substrate comprising:
provinding a shrink film comprising a heat shrinkable film, an adhesive layer on the heat shrinkable film, and a water soluble layer on the adhesive layer;
dissolving at least a portion of the water soluble layer to expose at least a portion of the adhesive layer;
applying the shrink film to the substrate; and
shrinking the heat shrinkable film so the heat shrinkable film conforms to the contours of the substrate,
wherein the adhesive layer is disposed on only a peripheral portion of the heat shrinkable film; and the applying operation comprises forming the shrink film into a tube by bonding at least two peripheral portions of the shrink film together with the exposed adhesive layer, and placing the tube around the substrate.

8. The method of claim 7 wherein:
the shrink film further has a release liner covering the water soluble layer, the release liner being free of silicon-containing and fluorine-containing material;
the method further comprising removing the release liner from the shrink film to reveal the water soluble layer.

9. A combination comprising a shrink film attached to a substrate wherein the shrink film comprises a heat shrinkable film, an adhesive layer on the heat shrinkable film forming a seam in the heat shrinkable film, and an amorphous polyvinyl alcohol polymer in contact with the adhesive layer,
wherein the amorphous polyvinyl alcohol is dissolved and mixed with the adhesive layer.

10. A combination comprising a shrink film attached to a substrate wherein the shrink film comprises a heat shrinkable film, an adhesive layer on the heat shrinkable film forming a bond with the substrate, and an amorphous polyvinyl alcohol polymer at an interface between the substrate and shrink film,
wherein the amorphous polyvinyl alcohol is dissolved and mixed with the adhesive layer.

* * * * *